(12) United States Patent
Horne

(10) Patent No.: US 9,932,884 B2
(45) Date of Patent: Apr. 3, 2018

(54) POWER SYSTEM WITH TURBINE BYPASS AND METHOD OF OPERATING A POWER SYSTEM

(75) Inventor: Thomas Alan Horne, Waynesboro, PA (US)

(73) Assignee: Volvo Lastvagnar AB, Göteborg (SE)

( * ) Notice: Subject to any disclaimer, the term of this patent is extended or adjusted under 35 U.S.C. 154(b) by 43 days.

(21) Appl. No.: 14/112,542

(22) PCT Filed: Apr. 21, 2011

(86) PCT No.: PCT/US2011/033348
§ 371 (c)(1),
(2), (4) Date: Oct. 17, 2013

(87) PCT Pub. No.: WO2012/145000
PCT Pub. Date: Oct. 26, 2012

(65) Prior Publication Data
US 2014/0026561 A1    Jan. 30, 2014

(51) Int. Cl.
*F02B 37/12* (2006.01)
*F02B 37/18* (2006.01)
*F02B 41/10* (2006.01)

(52) U.S. Cl.
CPC .............. *F02B 37/12* (2013.01); *F02B 41/10* (2013.01); *Y02T 10/163* (2013.01)

(58) Field of Classification Search
CPC ........ Y02T 10/163; F02B 37/12; F02B 37/18; F02B 37/183; F02B 41/00
USPC .......................................................... 60/624
See application file for complete search history.

(56) References Cited

U.S. PATENT DOCUMENTS

| | | | |
|---|---|---|---|
| 4,391,098 A * | 7/1983 | Kosuge | 60/602 |
| 4,614,086 A | 9/1986 | Koch | |
| 4,694,654 A * | 9/1987 | Kawamura | 60/597 |
| 4,882,906 A * | 11/1989 | Sekiyama et al. | 60/624 |
| 4,894,992 A * | 1/1990 | Sekiyama | F02B 37/005 60/624 |
| 4,897,998 A * | 2/1990 | Sekiyama | F02B 37/005 60/614 |

(Continued)

FOREIGN PATENT DOCUMENTS

| | | | | |
|---|---|---|---|---|
| DE | 3807372 A1 * | 9/1989 | | F02B 37/12 |
| DE | 4221734 A1 * | 1/1994 | | F02B 41/10 |

(Continued)

OTHER PUBLICATIONS

Machine translation of JP 10169455 A.*

(Continued)

*Primary Examiner* — Phutthiwat Wongwian
*Assistant Examiner* — Jessica Kebea
(74) *Attorney, Agent, or Firm* — WRB-IP LLP

(57) ABSTRACT

A power system includes an engine including an exhaust line, a turbine in the exhaust line, a bypass line connected to the exhaust line upstream of the turbine and comprising a controllable bypass valve, and a controller arranged to control opening of the bypass valve to bypass the turbine when, for example, the engine is operated such that power is transmitted from the crankshaft to the turbine shaft, and/or at least one of an engine load, an engine speed, and an exhaust line pressure are below predetermined levels. A method of operating a power system is also disclosed.

12 Claims, 2 Drawing Sheets

(56) References Cited

U.S. PATENT DOCUMENTS

| | | | |
|---|---|---|---|
| 5,119,633 A | 6/1992 | Brooks et al. | |
| 5,142,868 A | 9/1992 | Woon et al. | |
| 6,311,494 B2 * | 11/2001 | McKinley | F02B 29/0406 |
| | | | 60/602 |
| 6,886,337 B2 * | 5/2005 | Friedrich et al. | 60/614 |
| 8,261,550 B2 * | 9/2012 | Sartre | B60K 6/365 |
| | | | 60/607 |
| 2006/0123784 A1 | 6/2006 | Algrain | |
| 2006/0130465 A1 | 6/2006 | Sun et al. | |
| 2006/0254565 A1 * | 11/2006 | Bottcher et al. | 123/559.1 |
| 2007/0186552 A1 * | 8/2007 | Vogelsang et al. | 60/624 |
| 2007/0246942 A1 * | 10/2007 | Stahlhut et al. | 290/40 A |
| 2008/0000226 A1 | 1/2008 | Arndt et al. | |
| 2008/0223023 A1 | 9/2008 | Robel | |
| 2010/0154414 A1 * | 6/2010 | Schwarzenthal et al. | 60/605.1 |
| 2012/0227397 A1 * | 9/2012 | Willi et al. | 60/605.1 |
| 2013/0055711 A1 * | 3/2013 | Hofer et al. | 60/602 |
| 2014/0331656 A1 * | 11/2014 | Nagar | F02B 75/28 |
| | | | 60/297 |

FOREIGN PATENT DOCUMENTS

| | | | | |
|---|---|---|---|---|
| DE | 10339857 A1 * | 3/2005 | | F02B 41/10 |
| EP | 0477579 A2 * | 4/1992 | | B60T 1/08 |
| EP | 1101917 A2 | 5/2001 | | |
| EP | 2042705 A1 * | 4/2009 | | F02B 37/10 |
| JP | S6138127 A | 2/1986 | | |
| JP | 61132722 A * | 6/1986 | | |
| JP | S61132722 A | 6/1986 | | |
| JP | 63100225 A * | 5/1988 | | F02B 41/10 |
| JP | H01116245 | 5/1989 | | |
| JP | 04-01575 B2 * | 3/1992 | | |
| JP | H04272431 A | 9/1992 | | |
| JP | 05033668 A * | 2/1993 | | F02B 41/10 |
| JP | 8240156 A | 8/1996 | | |
| JP | H09222026 A | 8/1997 | | |
| JP | 10169455 A * | 6/1998 | | |
| JP | H10169455 A | 6/1998 | | |
| JP | H10339156 A | 12/1998 | | |
| JP | 2007303295 A | 11/2008 | | |
| WO | 9202719 A1 | 2/1992 | | |
| WO | WO 2010066452 A1 * | 6/2010 | | F02B 37/12 |
| WO | WO 2015188842 A1 * | 12/2015 | | F02B 37/013 |

OTHER PUBLICATIONS

JP 61132722 A English Translation.*
JPO Translation of 04-015375B, published on Mar. 17, 1992.*
Extended European search report for corresponding EP application No. 11863990.5 dated Sep. 6, 2014.
International Search Report (dated Jul. 8, 2011) for corresponding International Application PCT/US2011/033348.
International Preliminary Report on Patentability (dated Jul. 8, 2011) for corresponding International Application PCT/US2011/033348.
Russian Official Action (translation) (dated 2015) for corresponding Russian Application 2013 151 619.
Japanese Offiical Action (dated Dec. 19, 2014) (translation) for corresponding Japanese Application 2014-506373.
Translation of official action dated Dec. 24, 2014 for corresponding Japan application No. 2014-506373.
Translation of official action dated Dec. 1, 2015 for corresponding Japan application No. 2014-506373.

* cited by examiner

POWER SYSTEM WITH TURBINE BYPASS AND METHOD OF OPERATING A POWER SYSTEM

BACKGROUND AND SUMMARY

The present invention relates generally to power systems and, more particularly, to power systems including internal combustion engines with power turbines.

During operation of a mechanical turbo compound system on an internal combustion engine there are times when the power flow reverses. That is, power from the engine is actually transferred to the shaft of the turbo compound power turbine. During normal operation of the system, energy from the exhaust is used to drive the power turbine. The standard flow of energy is from the output shaft of the power turbine to the engine crankshaft. The power reversal occurs during lower engine speed and load conditions when the exhaust flow becomes too low to drive the turbo compound turbine at a power level above what is necessary to drive, power to the crankshaft. During these times of energy reversal, the power is actually moving from the engine to the power turbine of the turbo compound unit. The power reversal causes increased back pressure in the turbocharger turbine outlet thereby causing higher engine fuel consumption.

According to an aspect of the present invention, a power system comprises an engine comprising an exhaust line, a turbine in the exhaust line, a bypass line connected to the exhaust line upstream of the turbine and comprising a controllable bypass valve, and a controller arranged to control opening of the bypass valve, to bypass the turbine when at least one of an engine load, an engine speed, and an exhaust line pressure are below predetermined levels.

According to another aspect of the present invention, a power system comprises an engine comprising an exhaust line, a turbine in the exhaust line, a turbine shaft of the turbine being coupled to a crankshaft of the engine to permit transmission of power between the turbine shaft and the crankshaft, a bypass line connected to the exhaust line upstream of the turbine and comprising a controllable bypass valve, and a controller arranged to control opening of the bypass valve to bypass the turbine when the engine is operated such that power is transmitted from the crankshaft to the turbine shaft.

According to yet another aspect of the present invention, a method of operating a power system comprises exhausting as from an engine into an exhaust line, and controlling a bypass valve to open a bypass line arranged to bypass a turbine in the exhaust line when the engine is operated such that power would otherwise be transmitted from the crankshaft to the turbine shaft.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
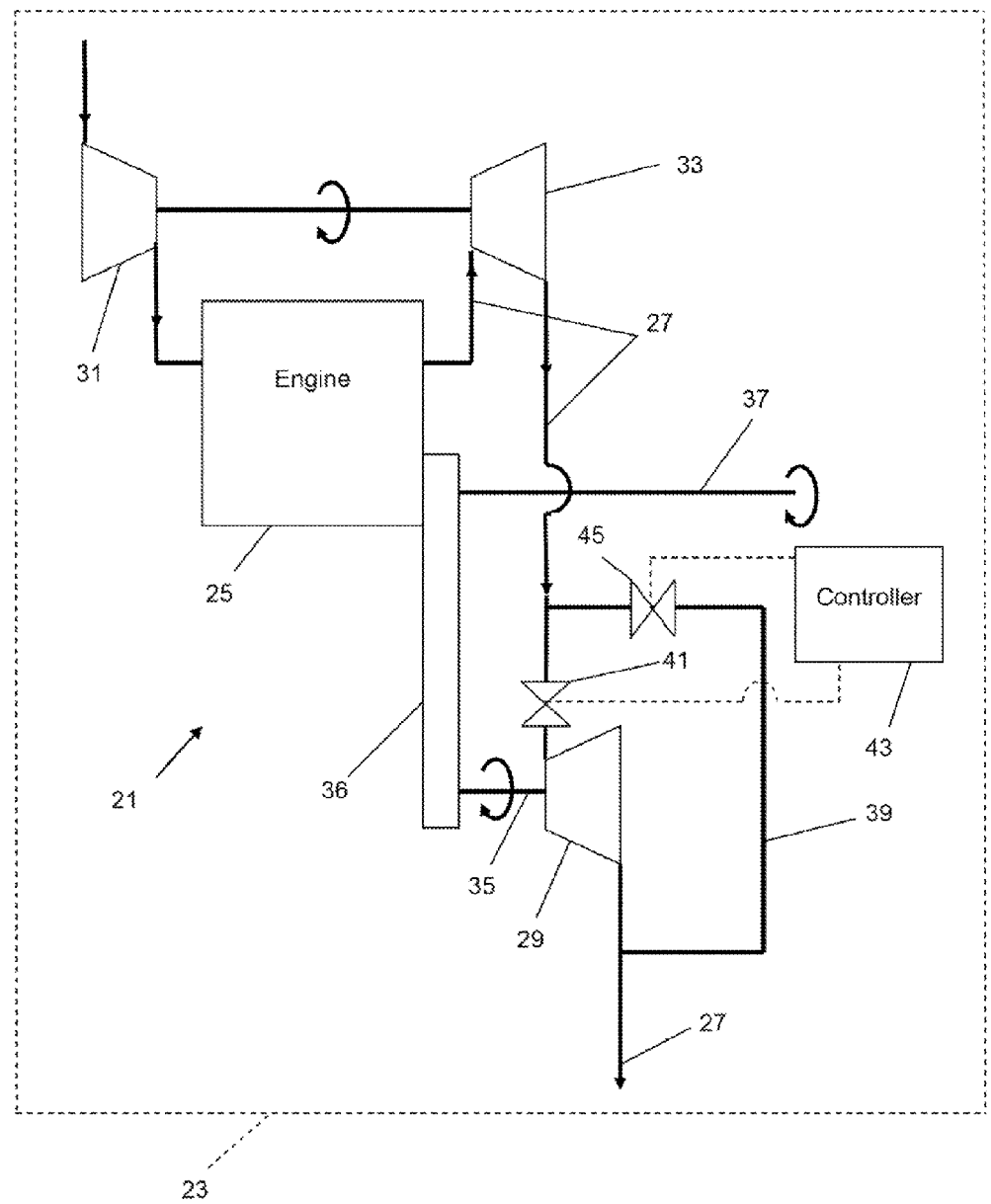
FIG. 1 is a schematic view of a power system according to an aspect of the present invention.

A power system 21 according to an aspect of the present invention is shown schematically in FIG. 1. The power system 21 can be used in a vehicle 23 (shown schematically in phantom) such as a truck, boat, bus, or other vehicle, or in a stationary application. The power system 21 includes an engine 25 comprising an exhaust line 27, The engine 25 is an internal combustion engine, such as a diesel engine, although the engine ma be a spark ignition engine. A turbine 29 is provided in the exhaust line downstream of the engine 25.

The turbine 29 is ordinarily the power turbine of a turbo compound system including a compressor 31 upstream of the engine and coupled to a turbocharger turbine 33 downstream of the engine and upstream of the power turbine. A turbine shaft 35 of the power turbine 29 is coupled by any suitable means such as a gear train or auxiliary device pulleys 36 to a crankshaft 37 of the engine 25 to permit transmission of power between the turbine shaft and the crankshaft. When pressure in the exhaust line 27 is sufficiently high, the power turbine 29 transmits power to the crankshaft 37, When pressure in the exhaust fine 27 tails below a certain level, however, such as at low speed/low load operation of the engine, power from the engine 25 is transferred to the turbine, shaft 35 of the power turbine 29. The operating conditions under Which power is transferred to the turbine shaft 35 will vary from engine type to engine type, however, for a six cylinder heavy duty diesel engine with an engine bore between 100 and 160 mm, this point has been observed when engine operating conditions are such that Brake Mean Effective Pressure (BMEP) of the engine 25 is at 0.5 MPa or less, and or engine torque is below 750 Nm, and/or engine speed is about 1400 rpm or less.

Figure 2:
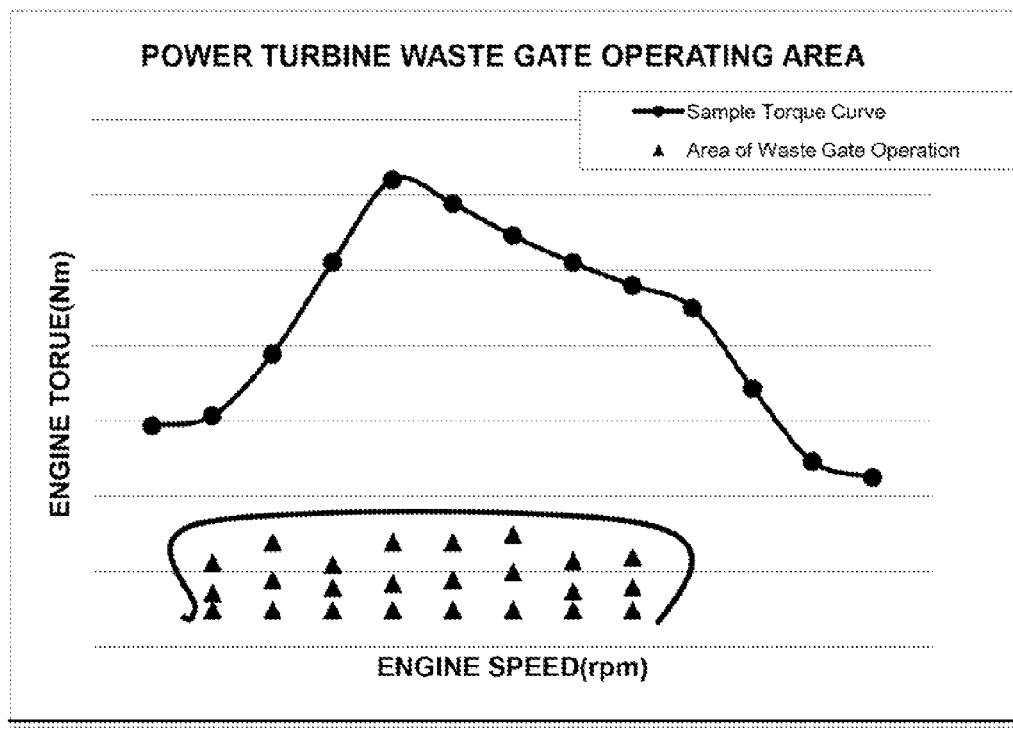
FIG. 2 is a graph of engine torque versus engine speed for a turbo-compound internal engine power system according to an aspect of the present invention, and showing engine operating conditions wider which a power turbine would be bypassed.

A bypass line 39 is connected to the exhaust line 27 upstream of the turbine 29 and comprises a controllable bypass valve 45. A controller 43 is arranged to control opening of the bypass valve 45 to bypass the turbine 29 when the engine 21 is operated under conditions such that power would be expected to be transferred to the turbine shaft 35. For example, the controller 43 might control the bypass valve 45 to open in response to a determination that at least one of an engine load, an engine speed, and an exhaust line pressure are below predetermined levels, although it will be appreciated that the valve 45 might be opened for other reasons. The graph shown in FIG. 2 illustrates conditions under which the bypass lit also referred to as a waste gate) might be open for a six cylinder heavy duty diesel engine with an engine bore between 1.00 and 160 mm.

The bypass valve 45 may be a simple on oil valve but ordinarily, it will be useful to provide a valve that is controllable to move to various positions between fully open and fully closed. For example, under certain operating conditions that will vary from system to system, the bypass valve 45 can be partially opened to reduce backpressure that might tend to result in the turbine shaft 35 drawing power from the crankshaft 37 so that the turbine 29 provides power to the crankshaft 37 using the lesser amount of exhaust flow that does pass through the turbine. A controllable valve 41 can be provided between the bypass line and the turbine upstream of the turbine to ensure that flow tends to flow through the bypass line 39 rather than through the turbine 29.

In a method of operating a power system 21 according to an aspect of the present invention, gas is exhausted from the engine 25 into the exhaust line 27. When the engine 25 is operated such that, for example, power is transmitted from the crankshaft 37 to the turbine shaft 35, and or such that at least one of an engine load, an engine speed, and an exhaust line pressure are below predetermined levels, the bypass valve 45 can be controlled to fully or partially open and thereby open the bypass line 39 to fully or partially bypass the turbine 29 in the exhaust line. The valve 41 upstream of the turbine 29 can be controlled at the same time to facilitate ensuring flow occurs through the bypass line 39. It will be appreciated that the circumstances listed herein that might result in opening or closing the valves 41 and 45 are illustrative, not limiting.

In a further aspect of the present invention, the controller 43 is what shall be broadly referred to as a computer programmed to permit the power system to perform the method described above. A non-transitory computer readable medium such as a disk can be provided containing computer code for performing the method.

The power system, method, and other aspects of the present invention are believed to compare favorably to known approaches to keep one mechanical system from driving another, such as an overrun clutch. Were an overrun clutch to be used, for example, in combination with the power turbine on the heavy ditty diesel or stationary engine, a physical break or freewheel would have to be provided in the gear train. The added complexity and number of parts needed to incorporate the overrun clutch would be substantial, whereas the bypass line and valve is comparatively simple. An overrun clutch would also unlike the bypass line and valve, likely in substantial extra cost and weight. Also, the system and method of the present invention can cause the power turbine to be bypassed at high speed and low load conditions to avoid having the power turbine act as a drag on the system, and to be engaged at low speed and high load conditions to take advantage of power available in the exhaust. By contrast, an overrun clutch will ordinarily not be arranged to address torque. The overrun clutch will merely disengage when a rotational speed of a driven shaft is less than the rotational speed of a driveshaft.

Moreover, an overrun clutch would be expected to have durability issues that would not be expected with the bypass line and valve.

Further, failure of the waste gate, full open, full dosed or anywhere. in between would not be expected to do harm to the engine or turbine, whereas failure of physical gearing associated with an overrun clutch could cause damage to the gear train or oil system of the engine.

Finally the bypass valve and line according to the present invention need only unload (fully or partially) the turbine. The turbine shaft can continue to spin with the crankshaft. Torque alone is affected by opening the bypass valve and line. By contrast, an overrun clutch would isolate both speed and torque, i.e., the turbine shaft would not continue to spin with the crankshaft.

In the present application, the use of terms such as "including" is open-ended and is intended to have the same meaning as terms such as "comprising" and not preclude, the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A power system, comprising:
   air engine comprising a crankshaft and an exhaust line;
   a power turbine in the exhaust line, the power turbine being coupled to the crankshaft;
   a bypass line connected to the exhaust line upstream of the power turbine and comprising a controllable bypass valve;
   a controllable valve between the bypass line and the power turbine, upstream of the power turbine; and
   a controller configured to control opening of the bypass valve and the controllable valve to bypass the power turbine when the engine is operated to transmit power from the engine to the power turbine and at least one of on engine load, an engine speed, and an exhaust line pressure are below predetermined levels, wherein the power turbine remains coupled to the crankshaft when the bypass valve is open, wherein the bypass valve and the controllable valve are controllable to move to positions between fully open and fully closed, and wherein the controller is configured to control the controllable valve to fully close when the engine is operated to transmit power from the engine to the power turbine and the at least one of the engine load, the engine speed, and the exhaust line pressure are below predetermined levels.

2. The power system as set forth in claim 1, wherein the power turbine is a power turbine of a turbo compound system.

3. A vehicle comprising the power system as set forth in claim 1.

4. The power system as set forth in claim 1, wherein the controller is arranged to control opening of the bypass valve to bypass the power turbine when the engine is operated to transmit power from the engine at a low engine load that is below a predetermined level.

5. A method of operating a power system, comprising:
   exhausting gas from an engine into an exhaust line; and
   controlling a bypass valve in a bypass line and a controllable valve in the exhaust line downstream of the bypass line and upstream of a power turbine in the exhaust line to open the bypass line arranged to bypass the power turbine and fully close the controllable valve when the engine is operated so that at least one of an engine load, an engine speed, and an exhaust line pressure are below predetermined levels such that power is transmitted from the engine to the power turbine and such that power would otherwise be transmitted from a crankshaft of the engine to a turbine shaft of the power turbine that is coupled to the crankshaft of the engine, the power turbine remaining coupled, to the crankshaft when the bypass valve is open,
   moving the bypass valve to a position between fully open and fully closed.

6. The power system as set forth in claim 1, wherein a coupling between the power turbine and the crankshaft consists of a gear train.

7. The power system as set forth in claim 1, wherein a coupling between the power turbine and the crankshaft consists of pulleys.

8. A power system, comprising:
   an engine comprising a crankshaft and an exhaust line;
   a power turbine in the exhaust line, the power turbine being coupled to the crankshaft;

a bypass line connected to the exhaust line upstream of the power turbine and comprising a controllable bypass valve;

a controllable valve between the bypass line and the power turbine, upstream of the power turbine; and a controller configured to control opening of the bypass valve and the controllable valve to bypass the power turbine when the engine is operated so that power is transmitted from the engine to the power turbine and from the crankshaft to the turbine shaft, wherein the turbine shaft of the power turbine remains coupled to the crankshaft when the bypass valve is open, wherein the bypass valve and the controllable valve are controllable to move to positions between fully open and fully closed, and wherein the controller is configured to control the controllable valve to fully close when the engine is operated to transmit power from the crankshaft of the engine to the turbine shaft of the power turbine.

9. A vehicle comprising the power system as set forth in claim 8.

10. The method as set forth in claim 5, comprising controlling the bypass valve to open the bypass line arranged to bypass a power turbine in the exhaust line when the engine is operated such that only low power below a predetermined level is transmitted from the engine.

11. A computer programmed to perform the method of claim 5.

12. A non-transitory computer readable medium containing computer code for performing the method of claim 5.

* * * * *